March 13, 1956 P. WESTFALL 2,737,735
HOOD MOUNT AND HOIST MECHANISM FOR BULLDOZER BLADE
Filed April 14, 1951 2 Sheets-Sheet 1

INVENTOR.
Paul Westfall
BY
Atty.

March 13, 1956     P. WESTFALL     2,737,735
HOOD MOUNT AND HOIST MECHANISM FOR BULLDOZER BLADE
Filed April 14, 1951     2 Sheets-Sheet 2

INVENTOR.
Paul Westfall
BY
Atty.

United States Patent Office 2,737,735
Patented Mar. 13, 1956

2,737,735

HOOD MOUNT AND HOIST MECHANISM FOR BULLDOZER BLADE

Paul Westfall, Portland, Oreg.

Application April 14, 1951, Serial No. 221,111

6 Claims. (Cl. 37—144)

This invention relates to a tractor equipped with a bulldozer blade or other ground working tool and, in particular, to an improved mounting for the mechanism which is employed to raise and lower the tool with respect to the ground, whereby an unobstructed view is provided for the tractor operator.

Since my invention is of particular utility in conjunction with a bulldozer blade, this type ground working tool has been selected to illustrate and explain my preferred inventive embodiment. To this end, the conventional bulldozer blade may be said to include three structural elements rather than one. Firstly, the blade per se is a dished pusher element adapted to cut or slice the earth, roll it over, and push it forward. Secondly, there is provided a pair of longitudinal arms extending rearwardly to mount the blade upon the tractor. An example of one such arm mounting structure will be found in my copending application, Serial No. 221,109, filed April 14, 1951, and entitled Bulldozer Blade Arm Mounting. Thirdly, an actuation mechanism is employed to raise and lower the blade with respect to the ground. It is toward an improvement in this third element, and in the mounting therefor, that the instant invention is directed.

In the Douglas fir, cedar and spruce logging areas of the Pacific Northwest, the tractor mounted bulldozer blade is a prime work tool. Logging men utilize this tool to build access roads through the woods, to clear camp and log assembly areas, and, together with a ramp, to load the logs for shipment to market. All of these operations, of necessity, often are performed in primitive, mountainous country far removed from the repair and maintenance facilities of the city. Accordingly, logging equipment, whether it be a truck, arch, or tractor, must possess a rugged strength and a trouble-free simplicity commensurate with the work conditions encountered and the repair facilities available.

It is because of the above listed conditions that most logging men prefer the well-known cable and pulley type blade actuation mechanism to the equally well-known hydraulic piston and cylinder type. That is to say, two conventional mechanism types are available for raising and lowering the blade of a tractor or bulldozer during an earth moving operation. The first of these employs a hydraulic motor unit, together with a complex pump, valve, and conduit structure to articulate the blade. The second type, on the other hand, employs a simple cable and pulley system in conjunction with the winch which is standard equipment on a tractor. Clearly, the repair and maintenance of the latter type mechanism is far simpler than that of the former, cable and pulley parts being available abundantly in most logging camps whereas pumps, pistons, and valves are not. Accordingly, and since my tractor is intended primarily for use in the primitive logging areas of the Pacific Northwest, this invention is directed toward an improvement in the cable and pulley type blade actuation mechanism.

Typically, the preferred type of actuation mechanism includes an A or U frame mounted on the chassis or track frame of the tractor and extending vertically over and above the front end of the engine hood. This frame carries one or more pulleys in cooperation with an equal number of pulleys secured to the top of the bulldozer blade. In addition, a power winch is mounted on the tractor and joined to one or more cables. This cable or these cables are reeved over the pulleys in such a manner that actuation of the winch selectively will raise or lower the blade.

In my study of and experimentation with the typical or conventional mechanism two inherent functional disadvantages have come to my attention. The first of these concerns the manner in which the massive A or U frame structure obstructs the driver's forward observation. Thus, as was explained, the frame extends up and over the hood and tractor directly in front of the driver. In addition, the legs or supports for many such frames extend down the sides of the hood to the frame or chassis in such a manner as to prevent the driver from having a clear view of the lower or cutting edge of the blade. Conventionally, however, it is this lower edge which an experienced driver watches to gauge the depth of cut and to judge the progress of his work. Accordingly, this view obstruction disadvantage may be said to bottom my first inventive object.

One object of my invention is to provide a mounting for the cable and pulley type blade actuation mechanism, which mounting will provide a clear and unobstructed forward and downward view, all to the end of enhancing and simplifying the control of a grading and earth-moving operation with a tractor.

The second inherent disadvantage above mentioned is one of structural strength, so vital to a tractor working in the woods. Thus, the conventional A or U frame mounting adequately will resist vertical and compressive forces. It does not, however, possess any marked degree of resistance to horizontal side-sway or shearing forces since the legs or supports, of necessity, are cantilevered vertically into the air from the tractor chassis. While such a weakness is not often tested, it can be critical to a logger should the frame fail in the woods, since adequate repair facilities often are not available. The disadvantages of this side-sway or shear force weakness may be said to bottom my second inventive object.

A second object of my invention is to provide a cable and pulley mounting structure which adequately will resist large side-sway or shear forces, thereby to assure a continuous, efficient logging operation with a minimum of breakdowns.

To this end, my inventive structure includes a rugged housing member having reinforced vertical sidewalls and a horizontal cover or top plate joined together to define a protective hood overlying the motor of the tractor. This hood, in turn, rests directly on the frame or chassis of the tractor and carries the pulleys for raising and lowering the blade. One of these pulleys is secured directly to each side of the hood at a point below the plane of the horizontal top plate or cover. Thus, I have eliminated entirely the conventional superstructure or cantilevered frame which overlies and projects above the prior art tractors. In addition, I prefer to position the pulleys carried by the blade in such a manner that they are spaced only the width of the aforementioned protective hood. Thus, all four pulleys, together with the cable mechanism lie as far inboard and as closely adjacent the hood as is possible. This location is of material aid in providing an unobstructed view of the lower or cutting edge of the blade from the driver's seat. Taken together, my mounting structure will be seen to overcome both of those disadvantages inherent in the conventional structure.

Other objects and advantages of my invention will be set forth in the following detailed description, taken in conjunction with the accompanying drawings, wherein.

Figure 4:
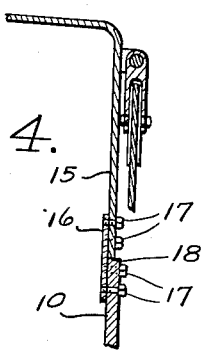
Figure 3:
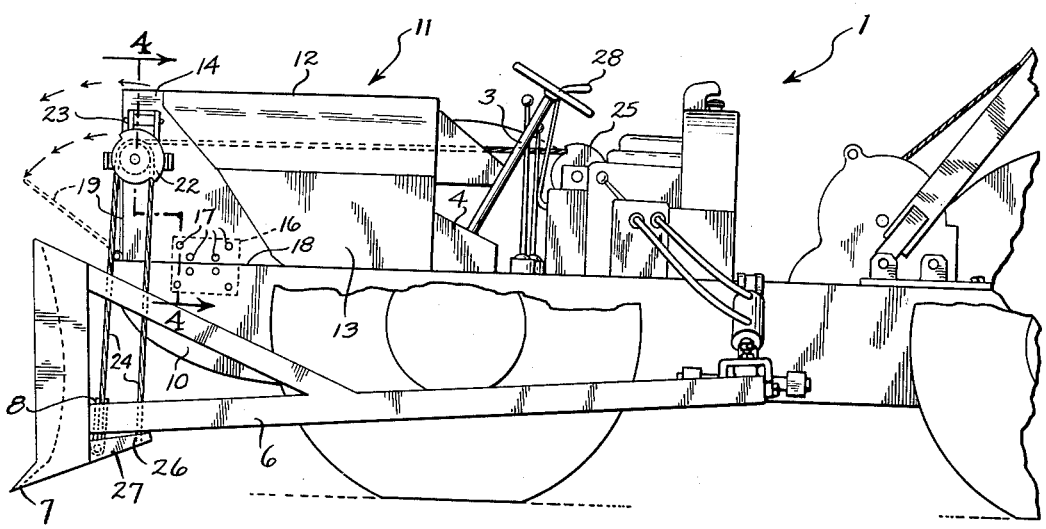

Fig. 3 is a side view, partially broken away and foreshortened, better to indicate the manner in which I pivot an apertured screen member and the front portion of the protective hood about coinciding lateral axes and also to indicate the manner in which the side pulleys are carried below the plane of the top plate or cover member thereby to provide an unobstructed view from the driver's seat; and Fig. 4 is a detail view, taken substantially on the line 4—4 of Fig. 3, and showing the manner in which the front portion of the engine hood side walls are reinforced and are provided with an enlarged bearing surface or contact area to increase the load carrying capacity thereof.

The mounting mechanism of the instant invention is equally as advantageous for use with a wheeled or a track-laying type tractor. However, in the drawings, I have illustrated a wheeled tractor 1 carrying an articulated loading or logging arch 2. While this arch forms no part of the instant invention, the details thereof are fully disclosed in my copending application Serial No. 221,110, filed April 14, 1951, and entitled Articulated Arch for Tractor, now Patent No. 2,691,481.

Similarly, any conventional steering mechanism may be employed to control the tractor 1. However, I have illustrated a central control column 3 projecting from a control housing 4. This control column and housing actuate a novel concentric clutch and brake mechanism to steer the tractor in accord with the invention disclosed in my copending application Serial No. 221,112, filed April 14, 1951, and entitled Clutch and Brake Control Mechanism, now Patent No. 2,712,370.

In a conventional manner, and as preferred by most loggers, I have shown a bulldozer blade 5 having two rearwardly extending arms 6 mounted on the tractor. The back of the blade 5, adjacent the lower or cutting edge 7, carries two guarded pulley members 8 defining a sheave means. To provide a limited amount of pivotal movement between the pulleys 8 and the blade 5, identical journal members 9 are employed. This sheave means and these pulleys cooperate with additional structure, hereinafter described, to raise and lower the blade 5 during an earth-moving operation.

Figure 1:
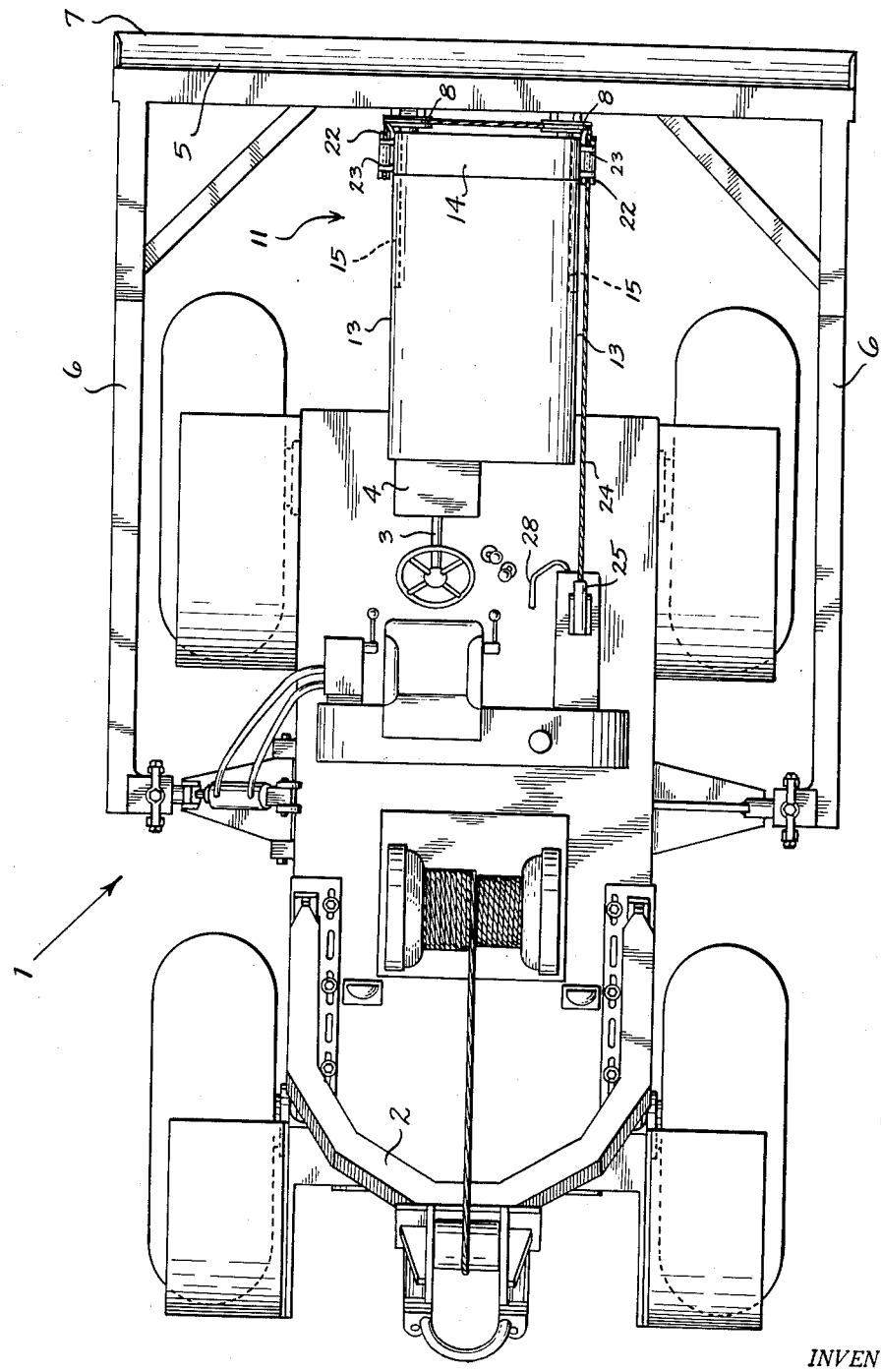
Fig. 1 is a top or plan view of a wheeled tractor incorporating the several features of my novel cable and pulley mounting mechanism.

Referring more particularly to Figs. 1 and 3, I have shown an elongated frame member 10 carrying the motor for the tractor on the forward end thereof. Overlying and encompassing the motor is a protective hood 11 having a horizontal top or cover plate member 12 and two vertical side wall members 13. As best indicated in Fig. 3, the front portion of the protective hood 11 is separate from the remainder thereof. Furthermore, this front portion is more massive and is reinforced throughout for a purpose later to be described. As shown, this front portion includes a lateral top plate 14 and two vertical wing portions 15. Thus, this top plate 14 and the wing portions 15 define a reinforced arch member coinciding with the shape of the remainder of the protective hood 11 and constituting the front portion thereof.

In Figs. 3 and 4, I have shown the manner in which the elements of the protective hood 11 rest upon and are joined to the elongated frame member 10. To this end, an interior fastening plate 16 spans the abutting margins of the wing portions 15 and the frame member 10 and is secured thereto by a plurality of studs 17. In addition, the enlarged flat bottom area 18 of each massive wing portion 15 defines an oversize bearing surface or contact area to enhance the load transfer from the wing portion to the frame 10. That is to say, the enlarged bearing surfaces 18 help support the front portion of the protective hood 11 upon the elongated frame member 10.

As is conventional with most tractor engines, I provide a radiator and protective screen adjacent the front end thereof. The apertured screen member 19 is hinged on the front end of the frame member 10 as at 20. Thus, the screen may be pivoted downwardly, as indicated in Fig. 3, to provide access to the interior of the hood 11 and to clean the screen. I have found that such cleaning and such a hinge mount are essential when my invention is utilized in the woods since leaves, twigs, and other debris become secured to or embedded in the screen and wedged about the cooling fan. By providing the hinge 20, the apertured screen member 19 may be swung down and this embedded material may be poked out and dislodged both from the screen apertures and from about the fan without necessitating a complete dismantling of the hood 11.

Further in service to the access and cleaning advantage above detailed, I prefer to mount the reinforced front or arch portion of the hood (14, 15) upon a similar hinge 21. These hinges 20 and 21 utilize a common pintle so the pivot axes therefor coincide. Thus, ready access is provided to the entire motor. To gain this access, all that need be done is to remove the upper studs 17 and the rear portion of the hood 11, whereupon the front portion of the hood will pivot forwardly out of the way in the same manner as the pivot of the screen member 19.

Figure 2:
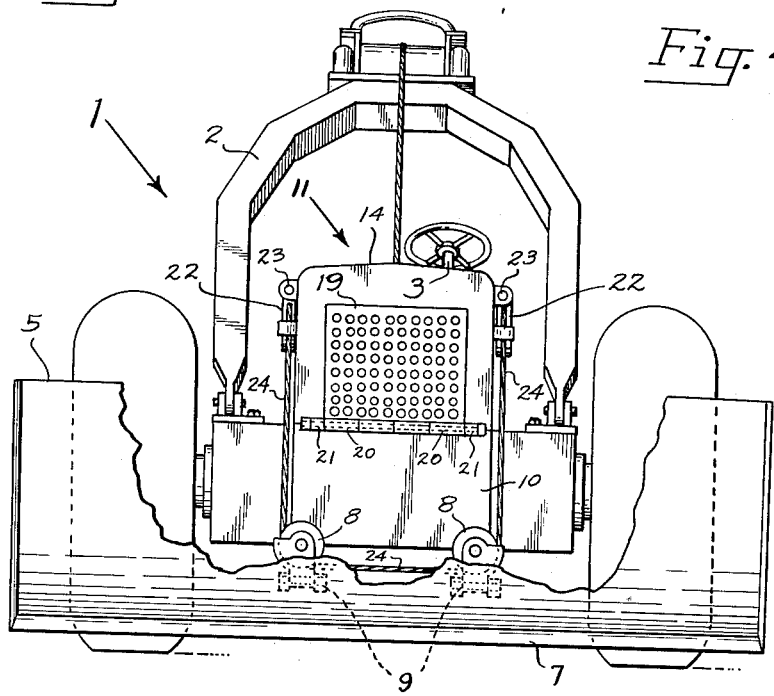
Fig. 2 is a front view, partially broken away, showing the manner in which I secure the pulleys of my invention to the sides of the protective hood and to the lower half of the bulldozer blade, respectively.

Turning now to my novel mounting structure, a second pair of guarded pulley members 22 is provided. Each pulley member 22 is fixed pivotally, as at 23, to the upper portion of one of the vertical side walls below the plane of the lateral top plate 14. Thus, as best indicated in Fig. 2, the pulley members 22 are mounted in a position where they do not obstruct either the forward or the downward vision of the tractor operator.

At 24, I have shown a cable or line which is reeved over the pulleys 8 and 22 and which articulates rearwardly and is joined to a power winch or hoisting means 25. The opposite end of the cable 24 is fixed, as at 26, to an arm 27 welded to the bulldozer blade 5. Thus, tracing the cable 24 from its joinder 26 to the blade 5 back to the power winch 25, it is reeved over the left hand pulley 22, under the left and right hand pulleys 8, over the right pulley 22, and rearwardly to the winch.

In operation, the driver raises and lowers the blade 5 by manipulating the control handle 28 for the power winch 25. Since the pulleys 8 and 22 and the cable 24 all are located closely adjacent the hood 11 and below the plane of the horizontal cover plate 12, the driver is provided with an unhampered view both forwardly and downwardly to the back of the cutting edge 7. Thus, I have eliminated entirely the conventional A or U frame and superstructure which overlie and project above the hood of prior art tractors. In addition, since the pulleys 8 are spaced substantially the width of the hood 11, they do not protrude nor obstruct the driver's view of the blade. Still further, by eliminating the aforementioned superstructure, I have provided a cable and pulley mount which will resist lateral, side-sway, or shear forces. Such resistance is enhanced by the strengthened and reinforced vertical wing portions 15 and the enlarged bearing area 18 provided for contact with the frame member 10. Each of these structural features is in direct service to the objects of my invention and is directed toward the provision of a superior woods tractor.

I claim:

1. A mounting structure for a bulldozer blade, comprising a tractor having an elongated frame carrying a motor on the forward end thereof, an elongated housing having separate but abutting front and rear portions of substantially the same cross sectional configuration, said front portion being mounted upon said frame for pivotal movement about a horizontal axis and including a side wall extending along each side of said motor and supported on said frame, each said side wall including a longitudinal wing portion having a flat bottom providing an enlarged bearing surface for supporting said housing on said frame, a cover plate joining said side walls and overlying said motor, a screen member extending across the front of said motor independent of the pivotal movement of said housing front portion and journaled on said frame selectively to pivot open and allow access to said motor, a pulley fixed to each said side wall below the plane of said cover plate, and hoisting means joined operatively to said pulleys selectively to raise and lower a ground-working implement carried by said tractor.

2. In combination with a tractor having an elongated chassis carrying a motor on the forward end thereof, an elongated housing member covering said motor and bearing on said chassis to define a protective hood member, and a bulldozer blade extending across the front end of said tractor and carrying sheave means for raising and lowering the same relative to said chassis, said protective hood member comprising; an arch member mounted pivotally on the forward end of said chassis and coinciding with the shape of said hood to constitute the front portion thereof, said arch member having spaced side wall members and a lateral top plate, each said side wall member having an elongated wing portion fixed thereto and extending rearwardly therefrom to provide an increased bearing surface in contact with said chassis, second sheave means carried by said arch member, and a hoisting means including a cable reeved through both of said sheave means to raise and lower said bulldozer blade.

3. In combination with a tractor having an elongated frame with a motor mounted thereon, an elongated housing member covering said motor and joined detachably to said frame to define a protective hood member, and a ground working tool extending across the front end of said tractor and carrying sheave means for raising and lowering the same relative to said frame, said sheave means including a pair of pulley members joined to the lower half of said tool and spaced apart a distance substantially equal to the lateral width of said protective hood member, said protective hood member comprising; an apertured screen means extending across the front of said hood and mounted pivotally upon said frame to provide ready access to the interior of said hood, a reinforced arch member coinciding with the shape of said hood and defining the front portion thereof, said screen means and arch member having coinciding lateral pivot axes, second sheave means carried by said arch member, and a hoisting means operable from said tractor including a cable, reeved through both of said sheave means, to raise and lower said ground-engaging tool.

4. In combination with a tractor having an elongated chassis carrying a motor on the forward end thereof, an elongated housing member covering said motor and joined detachably to said chassis to define a protective hood member, and a bulldozer blade extending across the front end of said tractor and carrying sheave means for raising and lowering the same relative to said chassis, said sheave means including a first pair of pulley members joined to the lower half of said blade and spaced apart a distance substantially equal to the lateral width of said protective hood member, said protective hood member comprising; a reinforced arch member mounted pivotally on the forward end of said chassis and coinciding with the shape of said hood to constitute the front portion thereof, said arch member having spaced side wall members joined together at their upper ends by a lateral top plate, a second pair of pulley members, each fixed to the upper portion of one of said side wall members below the plane of said lateral top plate for cooperation with said first pair of pulley members, and a hoisting means operable from said tractor to raise and lower said bulldozer blade, said hoisting means including a cable reeved over each of said pulley members and fixed at the respective ends thereof to said bulldozer blade and to a winch mounted on said tractor.

5. In combination with a tractor having an elongated chassis carrying a motor on the forward end thereof, an elongated housing member covering said motor and joined detachably to said chassis to define a protective hood member, and a bulldozer blade extending across the front end of said tractor and carrying sheave means for raising and lowering the same relative to said chassis, said sheave means including a pair of pulley members joined to the lower half of said blade and spaced apart a distance substantially equal to the lateral width of said protective hood member, said protective hood member comprising; an apertured screen means extending across the front of said hood and mounted pivotally upon said chassis to provide ready access to the interior of said hood, a reinforced arch member mounted pivotally on the forward end of said chassis and coinciding with the shape of said hood to constitute the front portion thereof, said screen means and arch member having coinciding lateral pivot axes second sheave means carried by said arch member, and a hoisting means operable from said tractor including a cable reeved through both of said sheave means to raise and lower said bulldozer blade.

6. In combination with a tractor having an elongated chassis carrying a motor on the forward end thereof, an elongated housing member covering said motor and joined detachably to said chassis to define a protective hood member, and a bulldozer blade extending across the front end of said tractor and carrying sheave means for raising and lowering the same relative to said chassis, said sheave means including a first pair of guarded pulley members joined pivotally to the lower half of said blade and spaced apart a distance substantially equal to the lateral width of said protective hood member, said protective hood member comprising; an apertured screen means extending across the front of said hood and mounted pivotally upon said chassis to provide ready access to the interior of said hood, a reinforced arch member mounted pivotally on the forward end of said chassis and coinciding with the shape of said hood to constitute the front portion thereof, said arch member having spaced side wall members joined together at their upper ends by a lateral top plate, a second pair of guarded pulley members, each fixed pivotally to the upper portion of one of said side wall members below the plane of said lateral top plate for cooperation with said sheave means, and a hoisting means operable from said tractor to raise and lower said bulldozer blade.

References Cited in the file of this patent

UNITED STATES PATENTS

| | | |
|---|---|---|
| 1,682,137 | McMillan | Aug. 28, 1928 |
| 2,066,456 | Brown | Jan. 5, 1937 |
| 2,243,306 | Ashton | May 27, 1941 |
| 2,375,801 | LeTourneau | May 15, 1945 |
| 2,447,397 | Craig | Aug. 17, 1948 |
| 2,468,809 | Brock et al. | May 3, 1949 |
| 2,485,407 | Peterson | Oct. 18, 1949 |

FOREIGN PATENTS

| | | |
|---|---|---|
| 123,025 | Australia | Dec. 19, 1946 |

OTHER REFERENCES

Catalog No. 104 of Carolina Tractor and Equipment Co., Salisbury, N. C., published before July 6, 1948, pp. 7 and 23.